United States Patent
Kashiwagi et al.

(10) Patent No.: US 11,237,548 B2
(45) Date of Patent: Feb. 1, 2022

(54) DATA DELIVERY CONTROL APPARATUS, METHOD, AND PROGRAM

(71) Applicant: Mitsubishi Electric Corporation, Tokyo (JP)

(72) Inventors: Ryo Kashiwagi, Tokyo (JP); Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/281,982

(22) PCT Filed: Dec. 27, 2018

(86) PCT No.: PCT/JP2018/048336
§ 371 (c)(1),
(2) Date: Apr. 1, 2021

(87) PCT Pub. No.: WO2020/136845
PCT Pub. Date: Jul. 2, 2020

(65) Prior Publication Data
US 2021/0318676 A1 Oct. 14, 2021

(51) Int. Cl.
*G05B 23/02* (2006.01)
*G06F 16/2455* (2019.01)

(52) U.S. Cl.
CPC ... *G05B 23/0259* (2013.01); *G06F 16/24568* (2019.01)

(58) Field of Classification Search
CPC ............ G05B 23/0259; G05B 23/0262; G06F 16/24568
See application file for complete search history.

(56) References Cited

U.S. PATENT DOCUMENTS 8,214,370 B1 * 7/2012 Turon ................. G06F 16/2477
707/741
10,467,143 B1 * 11/2019 Mason ................ G06F 12/0875
(Continued)

FOREIGN PATENT DOCUMENTS

JP         8-226830 A     9/1996
JP      2005-250521 A     9/2005
(Continued)

OTHER PUBLICATIONS

International Search Report and Written Opinion dated Mar. 5, 2019, received for PCT Application PCT/JP2018/048336, Filed on Dec. 27, 2018, 6 pages including English Translation.
(Continued)

*Primary Examiner* — Shean Tokuta
(74) *Attorney, Agent, or Firm* — Xsensus LLP

(57) ABSTRACT

A collector (110) included in a data delivery control apparatus (100) collects data from a PLC (603, 604) and outputs the data to which collection time information indicating collection time is added. A validity determiner (140) determines whether the data is valid based on whether the collection time indicated by the collection time information added to the data is at or later than a starting time indicating a time at which a data sequence as a preset data processing sequence is started. A deliverer (130) delivers the data in accordance with a data sequence setting defining the data sequence in response to validity determination means determining that the data is valid.

7 Claims, 8 Drawing Sheets

(56) References Cited

U.S. PATENT DOCUMENTS

| | | | |
|---|---|---|---|
| 11,025,691 B1* | 6/2021 | Ghare | H04L 65/60 |
| 2008/0131074 A1 | 6/2008 | Baba et al. | |
| 2012/0188997 A1* | 7/2012 | Zakrzewski | H04J 3/0667 |
| | | | 370/350 |
| 2016/0300403 A1* | 10/2016 | Harter | G07C 5/008 |
| 2017/0185055 A1 | 6/2017 | Nakajima et al. | |
| 2018/0077034 A1* | 3/2018 | Liang | H04Q 9/00 |
| 2018/0300365 A1* | 10/2018 | Li | G06F 11/3409 |
| 2020/0019150 A1* | 1/2020 | Shida | H04L 1/0045 |
| 2020/0042920 A1* | 2/2020 | Moorthy | G06F 9/5061 |
| 2021/0224383 A1* | 7/2021 | Mizoguchi | G06F 21/552 |
| 2021/0318676 A1* | 10/2021 | Kashiwagi | G05B 23/02 |

FOREIGN PATENT DOCUMENTS

| | | |
|---|---|---|
| JP | 2008-141497 A | 6/2008 |
| JP | 2011-174795 A | 9/2011 |
| JP | 2017-117267 A | 6/2017 |

OTHER PUBLICATIONS

Decision to Grant dated Sep. 3, 2019, received for Japanese Application 2019-534419, 5 pages including English Translation.

* cited by examiner

COLLECTION SETTING STORAGE ⸺120

| No. | DEVICE NAME | DATA NAME | SETTING DETAILS | EXECUTION FILE NAME | PATH |
|---|---|---|---|---|---|
| 1 | PLC 604 | VIBRATION 001 | IP ADDRESS:XXXX, PORT NO.:XX LOCATION:XXX, DATA TYPE: XX, DATA LENGTH:XX COLLECTION INTERVAL::XXX | EXECUTION FILE 001 | ... |
| 2 | PLC 605 | VIBRATION 002 | IP ADDRESS:XXXX PORT NO.:XX LOCATION:XXX DATA TYPE: XX DATA LENGTH:XX COLLECTION INTERVAL:XXX | EXECUTION FILE 002 | ... |
| 3 | PLC 604 | TEMPERATURE 001 | IP ADDRESS:XXXX PORT NO.:XX LOCATION:XXX DATA TYPE: XX DATA LENGTH:XX COLLECTION INTERVAL:XXX | EXECUTION FILE 003 | ... |

FIG.3

DATA SEQUENCE SETTING STORAGE 150

| No. | DATA COLLECTION TARGET | COLLECTION DATA | PROCESSING | ANALYTICAL PROCESSING | DIAGNOSTIC PROCESSING | FEEDBACK DESTINATION |
|---|---|---|---|---|---|---|
| 1 | PLC 604 | VIBRATION 001 | DATA PROCESSOR 160 | INFORMATION PROCESSOR 400: DATA PROCESSOR 410 | INFORMATION PROCESSOR 400: DATA PROCESSOR 410 | PLC 604 |
| 2 | PLC 605 | VIBRATION 200 | DATA PROCESSOR 160 | INFORMATION PROCESSOR 400: DATA PROCESSOR 410 | INFORMATION PROCESSOR 400: DATA PROCESSOR 410 | PLC 605 |
| ⋮ | ⋮ | ⋮ | ⋮ | ⋮ | ⋮ | ⋮ |

FIG.4

DATA DELIVERY CONTROL APPARATUS, METHOD, AND PROGRAM

CROSS-REFERENCE TO RELATED APPLICATION

The present application is based on PCT filing PCT/JP2018/048336, filed Dec. 27, 2018, the entire contents of which are incorporated herein by reference.

TECHNICAL FIELD

The present disclosure relates to a data delivery control apparatus, a method, and a program.

BACKGROUND ART

Patent Literature 1 describes a data processing apparatus that analyzes time-series data sequentially accumulated in a file to detect a specific event. Upon stopping processing, this data processing apparatus deletes data accumulated in the file and then restarts the processing to avoid operating erroneously by processing unintended data that may be accumulated in the file while the data processing apparatus is stopped. Unintended data not to be processed by the data processing apparatus may be, for example, abnormal data that may be accumulated in the file or accumulated data in the file that may be corrupted due to abnormalities while the data processing apparatus is stopped.

CITATION LIST

Patent Literature

Patent Literature 1: Unexamined Japanese Patent Application Publication No. 2011-174795

SUMMARY OF INVENTION

Technical Problem

Patent Literature 1 describes one application of the data processing apparatus that processes input data and outputs the results. However, complex processing may be divided into multiple steps, and the steps may be assigned to multiple applications included in one or more apparatuses. For example, to detect any failure in a factory automation (FA) device used in a factory production line, data collected from the FA device may be used to diagnose the FA device. This involves preprocessing before analyzing data collected from the FA device, analyzing the data collected from the FA device, and diagnosing the FA device based on the analysis result.

FIG. 8 is a diagram of a processing example of multiple steps assigned to multiple processors. In the illustrated example, data collected from a target T to be diagnosed is stored in a file F, and a data processor 101 performs preprocessing on data stored in the file F. A data processor 102 analyzes data output by the data processor 101, and outputs the analysis result. Based on the analysis result output by the data processor 102, a data processor 103 diagnoses the target T. The functions of the data processor 101, the data processor 102, and the data processor 103 are implemented by different applications.

As illustrated, when multiple data processors perform a series of processing, a data sequence indicating the details of each step of processing and the processing sequence is predefined, and the predefined data is stored in each of apparatuses that implement the data processors or an apparatus that controls the data sequence. Each data processor performs processing in accordance with the data sequence. To change the details of the data sequence, a user may temporarily stop the data sequence without stopping the data processors 101 to 103. Also, after data accumulated in the file F is deleted before the processing is restarted with the method described in Patent Literature 1, data is sequentially transferred to each data processor in the structure shown in FIG. 8. Thus, unprocessed data may remain in the data processors 102 and 103 when the user temporarily stops the processing of the data processors 101 to 103.

Once the processing is restarted, the data processors 102 and 103 first process the remaining data. However, with the details of the data sequence being changed, the data remaining in the data processors 102 and 103 may be changed to data not to be processed, or invalid data. The data processors 102 and 103 may then process such invalid data, causing the data processor 103 to feed a wrong diagnosis back to the target T to be diagnosed. This may be avoided by controlling data delivery to data processors to prevent processing of data accumulated before the restart of processing.

In response to the above issue, an objective of the present disclosure is to control data delivery to prevent processing of invalid data not to be processed by a data processor.

Solution to Problem

To achieve the above objective, in a data delivery control apparatus according to an aspect of the present disclosure, collection means collects data from a device and outputs the data to which collection time information indicating collection time is added. Validity determination means determines whether the data is valid based on whether the collection time indicated by the collection time information added to the data is at or later than a starting time indicating a time at which a data sequence as a preset data processing sequence is started. Delivery means delivers the data in accordance with a data sequence setting defining the data sequence in response to the validity determination means determining that the data is valid.

Advantageous Effects of Invention

The data delivery control apparatus according to the above aspect of the present disclosure determines whether data is valid based on whether a collection time at which the data is collected from a device is at or later than a time at which a data sequence, that is, a preset data processing sequence, starts. When determining that the data is valid, the data delivery control apparatus delivers the data in accordance with a data sequence setting that defines the data sequence. Such control of data delivery can prevent the data processor from processing invalid data.

BRIEF DESCRIPTION OF DRAWINGS

FIG. 3 is a table showing an example of data stored in a collection setting storage according to the embodiment;

FIG. 4 is a table showing an example of data stored in a data sequence setting storage according to the embodiment;

DESCRIPTION OF EMBODIMENTS

Embodiment

A data delivery control apparatus according to an embodiment of the present disclosure will now be described in detail with reference to the drawings.

Figure 1:
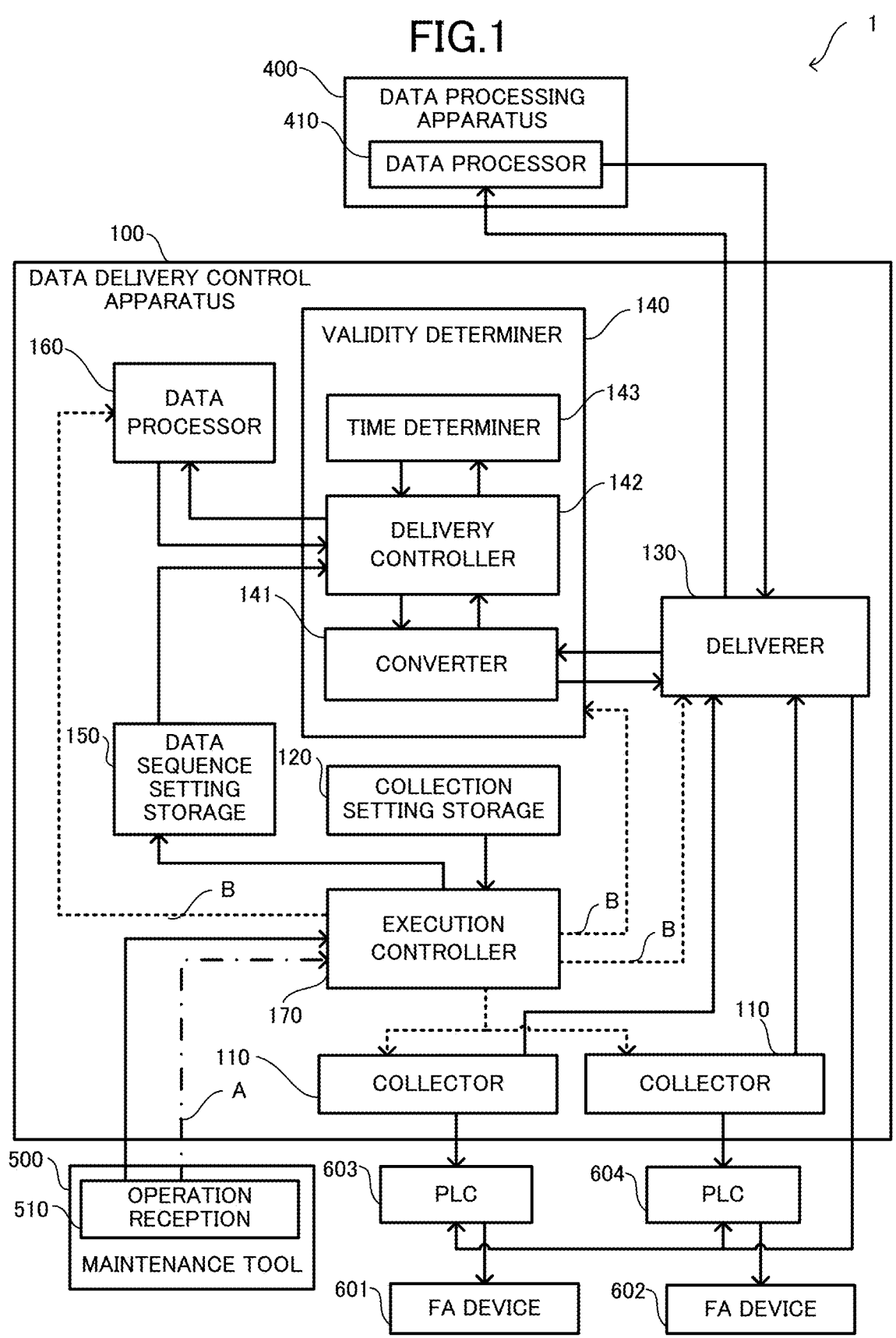
FIG. 1 is a functional block diagram of apparatuses in a diagnosis system according to an embodiment of the present disclosure.

A data delivery control apparatus 100 shown in FIG. 1 is included in a diagnosis system 1 that diagnoses devices in a factory for, for example, preventive or predictive maintenance of the devices in the factory. An overview of the diagnosis system 1 will be provided.

The diagnosis system 1 collects data from FA devices 601 and 602 in a factory, diagnoses the FA devices 601 and 602 based on the collected data, and feeds the diagnoses back to the FA devices 601 and 602.

The diagnosis system 1 includes a data delivery control apparatus 100 that collects data output by the FA devices 601 and 602 in the factory and controls delivery of the collected data, a data processing apparatus 400 that performs analytical and diagnostic processing on data provided from the data delivery control apparatus 100, and a maintenance tool 500 with which a user operates the data delivery control apparatus 100. Examples of the data delivery control apparatus 100 include an industrial personal computer (IPC) installed in the same factory as the factory where the FA devices 601 and 602 are installed. A server computer installed outside the factory is used as the data processing apparatus 400. A personal computer having a dedicated application installed and located in the same factory as the factory where the FA devices 601 and 602 is used as the maintenance tool 500.

The FA devices 601 and 602 are targets to be diagnosed by the diagnosis system 1, and are mechanical apparatuses used in a production line in the factory. The FA devices 601 and 602 include various sensors including a vibration sensor, a temperature sensor, a pressure sensor, and a flow rate sensor. A programmable logic controller 603 (hereafter a PLC 603) controls the FA device 601. A programmable logic controller 604 (hereafter a PLC 604) controls the FA device 602. Output values from sensors installed in the FA device 601 are provided to the PLC 603. Output values from sensors installed in the FA device 602 are provided to the PLC 604.

The data delivery control apparatus 100 can communicate with the FA devices 601 and 602 and the PLCs 603 and 604 with a network 701. The network 701 is in accordance with a fieldbus standard. The data delivery control apparatus 100 collects data of output values of the sensors installed in the FA device 601 through the PLC 603. The data delivery control apparatus 100 collects data of output values of the sensors installed in the FA device 602 through the PLC 604.

The data delivery control apparatus 100 communicates with the data processing apparatus 400 with a network 702. For example, the network 702 is in accordance with a standard such as 10BASE-T or 100BASE-T. The data delivery control apparatus 100 delivers data collected from the FA devices 601 and 602 to the data processing apparatus 400. Before delivering data collected from the FA devices 601 and 602 to the data processing apparatus 400, the data delivery control apparatus 100 performs, on the collected data, preprocessing for analytical and diagnostic processing performed by the data processing apparatus 400.

The data processing apparatus 400 performs analytical and diagnostic processing on data provided from the data delivery control apparatus 100, and transmits the diagnoses for the FA devices 601 and 602 to the data delivery control apparatus 100. Examples of the diagnoses include alert information alerting that the FA devices 601 and 602 deteriorate and are to undergo maintenance before failures can occur. The data delivery control apparatus 100 transmits the diagnoses received from the data processing apparatus 400 to the PLCs 603 and 604.

The data delivery control apparatus 100 thus controls data delivery between the PLCs 603 and 604 and the data processing apparatus 400. The data collected from the FA devices 601 and 602 is processed in multiple steps. Thus, the data delivery control apparatus 100 includes data indicating data sequence settings predefined for the details of each step and the sequence of the steps. The data sequence is herein a preset data processing sequence. The data delivery control apparatus 100 delivers data to a destination indicated by the data sequence settings.

The maintenance tool 500 is used by the user to operate the data delivery control apparatus 100. The user registers data sequence settings to the data delivery control apparatus 100 through the maintenance tool 500, and changes data indicating the data sequence settings registered to the data delivery control apparatus 100. The user is herein, for example, a manager of the diagnosis system 1.

For example, a change of the specifications of collected data may change the preprocessing performed by the data delivery control apparatus 100 and the data sequence settings. To change the data sequence settings, the user first stops processing performed by the data delivery control apparatus 100. After changing the data sequence settings of the data delivery control apparatus 100, the user restarts delivery processing of the data delivery control apparatus 100. In this case, data delivered from the data delivery control apparatus 100 before the change of the data sequence settings may be accumulated in the data processing apparatus 400. When the user cannot delete data delivered before the change of the data sequence settings from the data processing apparatus 400 because the data processing apparatus 400 is in another factory, the data processing apparatus 400 is a cloud server, or for any other reasons, the data processing apparatus 400 may process the data delivered before the change of the data sequence settings and transmit the diagnosis to the data delivery control apparatus 100 also after the change of the data sequence settings. This may cause a malfunction of the PLCs 603 and 604.

Thus, the data delivery control apparatus 100 according to the embodiment has the characteristics below. The data delivery control apparatus 100 stops transmission, to the data processing apparatus 400, of data collected from the PLCs 603 and 604 and not to be processed by the data processing apparatus 400. The data delivery control apparatus 100 also stops transmission, to the PLCs 603 and 604, of data received from the data processing apparatus 400 and not to be received by the PLCs 603 and 604.

More specifically, in response to an instruction from a user, the data delivery control apparatus 100 handles the data collected before the time at which collection and delivery processing is started as invalid data not to be processed, and discards the data.

In contrast, the data delivery control apparatus 100 handles data collected at or after the time at which collection and delivery processing is started as valid data to be processed, and delivers the data to a set destination. In the embodiment, the time at which the data delivery control apparatus 100 starts collection and delivery processing is referred to as the start time. A series of processing including collection and delivery processing performed by the data delivery control apparatus 100 may hereafter be referred to as a sequence. The time point at which the data delivery control apparatus 100 starts the sequence is an example of a starting point in the present disclosure.

Figure 2:
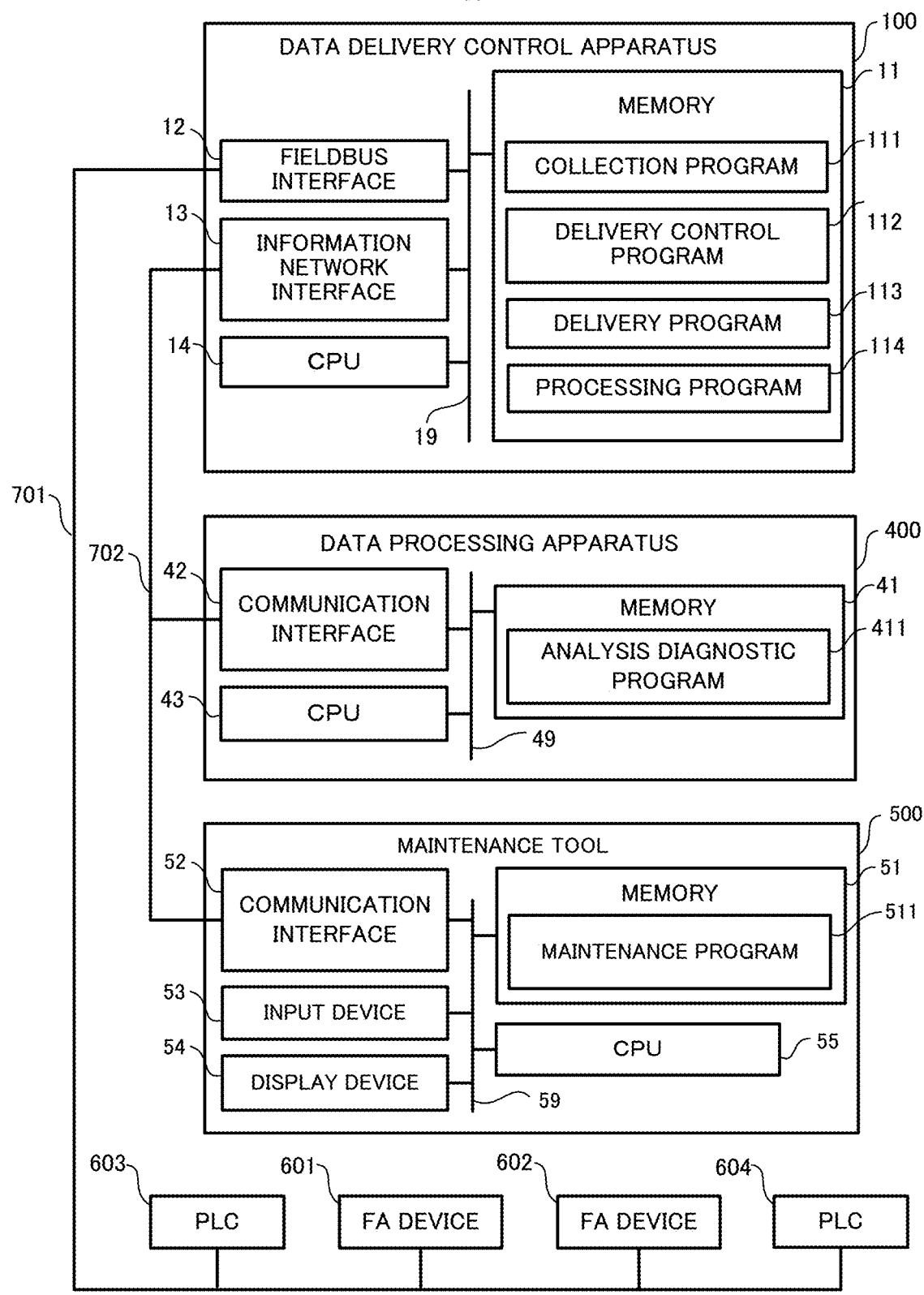
FIG. 2 is a block diagram of apparatuses in the diagnosis system according to the embodiment, showing the hardware configuration.

The hardware configuration of each apparatus included in the diagnosis system 1 will now be described. As shown in FIG. 2, the data delivery control apparatus 100 includes, as hardware components, a memory 11 that stores various programs and data, a fieldbus interface 12 that communicates with other apparatuses with the network 701, an information network interface 13 that communicates with other apparatuses with the network 702, and a central processing unit (CPU) 14 that centrally controls the data delivery control apparatus 100. The memory 11, the fieldbus interface 12, and the information network interface 13 are connected to the CPU 14 with a bus 19 to communicate with the CPU 14.

The memory 11 includes a volatile memory and a nonvolatile memory. The memory 11 stores programs for implementing various functions of the data delivery control apparatus 100. More specifically, the memory 11 stores a collection program 111, a delivery control program 112, a delivery program 113, and a processing program 114. The memory 11 is used as a work memory for the CPU 14.

The collection program 111 causes the data delivery control apparatus 100 to collect data from the PLCs 603 and 604. The delivery control program 112 causes the data delivery control apparatus 100 to control delivery. The delivery program 113 causes the data delivery control apparatus 100 to deliver data to a designated destination. The processing program 114 causes the data delivery control apparatus 100 to perform predetermined processing on data. Examples of predetermined processing include missing value processing and outlier processing.

The fieldbus interface 12 includes a network interface circuit, and communicates with the PLCs 603 and 604 with the network 701 as controlled by the CPU 14.

The information network interface 13 includes a network interface circuit, and communicates with the data processing apparatus 400 and the maintenance tool 500 with the network 702 as controlled by the CPU 14.

The CPU 14 executes various programs stored in the memory 11, and implements various functions of the data delivery control apparatus 100. More specifically, the CPU 14 executes the collection program 111 to collect data from the PLCs 603 and 604. The CPU 14 executes the delivery control program 112 to control data delivery between the data processing apparatus 400 and the PLCs 603 and 604. The CPU 14 executes the delivery program 113 to deliver data. The CPU 14 executes the processing program 114 to process data.

The data processing apparatus 400 includes, as hardware components, a memory 41 that stores various programs and data, a communication interface 42 that communicates with other apparatuses with the network 702, and a CPU 43 that centrally controls the data processing apparatus 400. The memory 41 and the communication interface 42 are connected to the CPU 43 with a bus 49 to communicate with the CPU 43.

The memory 41 includes a volatile memory and a nonvolatile memory. The memory 41 stores a program for implementing various functions of the data processing apparatus 400. The memory 41 is used as a work memory for the CPU 43. More specifically, the memory 41 stores an analysis diagnostic program 411. The analysis diagnostic program 411 causes the data processing apparatus 400 to perform analytical and diagnostic processing of data provided from the data delivery control apparatus 100.

The communication interface 42 includes a network interface circuit, and communicates with the data delivery control apparatus 100 and the maintenance tool 500 with the network 702 as controlled by the CPU 43.

The CPU 43 executes various programs stored in the memory 41 to implement various functions of the data processing apparatus 400. More specifically, the CPU 43 executes the analysis diagnostic program 411 to analyze data provided from the data delivery control apparatus 100 and diagnose the FA devices 601 and 602 based on the analysis result.

The maintenance tool 500 includes, as hardware components, a memory 51 that stores various programs and data, a communication interface 52 that communicates with other apparatuses with the network 702, an input device 53 that detects input operations of the user, a display device 54 that outputs images, and a CPU 55 that centrally controls the maintenance tool 500. The memory 51, the communication interface 52, the input device 53, and the display device 54 are connected to the CPU 55 with a bus 59 to communicate with the CPU 55.

The memory 51 includes a volatile memory and a nonvolatile memory. The memory 51 stores a program for implementing various functions of the maintenance tool 500. More specifically, the memory 51 stores a maintenance program 511. The memory 51 is used as a work memory for the CPU 55.

The maintenance program 511 is a program to implement, in accordance with an operation instruction from the user, the function of transmitting a processing start instruction relating to data collection and delivery control to the data delivery control apparatus 100, and the function of registering data indicating the data sequence settings to the data delivery control apparatus 100.

The communication interface 52 includes a network interface circuit, and communicates with the data delivery control apparatus 100 and the data processing apparatus 400 with the network 702 as controlled by the CPU 55. The input device 53 includes a mouse and operation keys, receives operation inputs from the user, and outputs signals indicating the operation inputs from the user to the CPU 55. The display device 54 includes a display, and displays images based on the signal provided from the CPU 55 on the display.

The CPU 55 executes various programs stored in the memory 51 and implements various functions of the maintenance tool 500.

The functional components of the data delivery control apparatus 100 will now be described with reference to FIG. 1. In FIG. 1, arrows drawn with solid lines denote data flow, and arrows drawn with broken lines and a dash-dot-dash line denote the transfer of control signals.

The data delivery control apparatus 100 includes, as functional components, collectors 110 that collect data from designated data collection targets, a collection setting storage 120 that stores data indicating the setting details for data collection, a deliverer 130 that delivers data to a designated destination, a validity determiner 140 that determines validity of data transferred through the data delivery control apparatus 100, a data sequence setting storage 150 that stores data indicating the setting details for a data sequence, a data processor 160 that performs defined data processing, and an execution controller 170 that controls execution of each component in the data delivery control apparatus 100 in response to an instruction from the user.

The collectors 110 collect data acquired by the sensors installed in the FA devices 601 and 602 from the PLCs 603 and 604. Each collector 110 adds time information indicating the time at which data is collected to the collected data, and transmits the data to which the time information is added to the deliverer 130. Upon receiving a signal instructing start of collection processing from the execution controller 170, the collector 110 starts collection processing, and collects data at collection intervals designated from the designated target in accordance with the settings on the collection processing stored in the collection setting storage 120. For example, the collector 110 performs first data collection when the time indicated by the designated collection interval has elapsed after receiving the signal instructing start of data collection processing from the execution controller 170. Thereafter, every after the time indicated by the designated collection interval elapses, the collector 110 performs data collection. The function of the collector 110 is implemented by the CPU 14 shown in FIG. 2 executing the collection program 111. The collector 110 is an example of collection means according to the present disclosure.

The collection setting storage 120 shown in FIG. 1 stores data indicating the details of the settings of the data collection processing performed by the collector 110. This data may also be referred to as collection setting data. The collection setting data includes information designated by the user, including information identifying the data collection target, information identifying data to be collected, the collection interval at which data is collected, and information identifying the collection program 111 for performing collection processing. The user stores the collection setting data into the collection setting storage 120 with the maintenance tool 500.

FIG. 3 shows examples of data stored in the collection setting storage 120. The data includes a device name of the device serving as a data collection target, the data name, the setting details, the execution file name, and the path. The device name and the setting details are designated by the user. The setting details include a data name that identifies the data to be collected, an Internet protocol (IP) address and a port number for identifying the data collection target device, the location of data to be collected, and the data type and data length of data to be collected.

The location of data to be collected includes information identifying the area in which the target data is stored in the memory area of the PLC 603 or 604. To collect data within a specific range in the memory area, the location includes the value indicating the first data position within the range, and the value indicating the last data position within the range. The execution file name and the path included in the collection setting data are information for identifying the program that implements the function of the collector 110 shown in FIG. 1, and are the file name and the path of the execution file of the collection program 111 shown in FIG. 2. The function of the collection setting storage 120 is implemented by the memory 11 shown in FIG. 2.

The deliverer 130 shown in FIG. 1 delivers data to the designated destination. More specifically, the deliverer 130 transmits data received from the collectors 110 and the data processing apparatus 400 to the validity determiner 140. The deliverer 130 also delivers data provided from the validity determiner 140 to the designated destination. This is because the validity determiner 140 determines the data validity, and provides the data that is determined to be valid to the deliverer 130 together with destination information indicating the destination. The destinations designated by the validity determiner 140 include the data processing apparatus 400 and the PLCs 603 and 604. The function of the deliverer 130 is implemented by the CPU 14 shown in FIG. 2 executing the delivery program 113. The deliverer 130 is an example of delivery means according to the present disclosure.

The validity determiner 140 determines whether data provided from the deliverer 130 is valid, and transmits the data determined to be valid to the next destination through the deliverer 130. The function of the validity determiner 140 is implemented by the CPU 14 shown in FIG. 2 executing the delivery control program 112. The validity determiner 140 is an example of validity determination means according to the present disclosure.

The validity determiner 140 will now be described in detail. The validity determiner 140 shown in FIG. 1 includes a converter 141 that converts data, a delivery controller 142 that controls delivery, and a time determiner 143 that acquires time information added to data.

The converter 141 converts data that has arrived at the data delivery control apparatus 100 from outside, and data to be transmitted from the data delivery control apparatus 100 to the outside.

More specifically, when the data provided from the deliverer 130 is the data received from the PLCs 603 and 604, the converter 141 converts the data into a predetermined internal format for the data delivery control apparatus 100, and outputs the resultant data to the delivery controller 142. This is due to the reasons below. The data delivery control apparatus 100 and the PLCs 603 and 604 exchange data with the network 701. Thus, data received by the deliverer 130 from the PLCs 603 and 604 is data in a format converted for the data exchange with the network 701. This is because the data delivery control apparatus 100 may fail to process data received by the converter 141 from the PLCs 603 and 604 unless the data format is converted into the internal format determined for the data delivery control apparatus 100.

When the data provided from the deliverer 130 is the data received from the data processing apparatus 400, the converter 141 converts the data format into the internal format determined for the data delivery control apparatus 100, and outputs the resultant data to the delivery controller 142. This is due to the reasons below. The data delivery control apparatus 100 and the data processing apparatus 400 exchange data with the network 702. Thus, data received by the deliverer 130 from the data processing apparatus 400 is data in a format converted for the data exchange with the network 702. Thus, the data delivery control apparatus 100 may fail to process data received by the converter 141 from the data processing apparatus 400 unless the data is converted into the internal format determined for the data delivery control apparatus 100.

When the data provided from the delivery controller 142 is the data addressed to the PLCs 603 and 604, the converter 141 converts the data format into the internal format determined for the PLCs 603 and 604, and outputs the resultant data to the deliverer 130.

When the data provided from the delivery controller 142 is the data addressed to the data processing apparatus 400, the converter 141 converts the data format into the data exchange format, and outputs the resultant data to the deliverer 130.

The delivery controller 142 determines whether data provided from the converter 141 is valid. More specifically, the delivery controller 142 outputs the data to the time determiner 143 to determine whether the collection time of the data provided from the converter 141 is at or later than the start time. The start time is prestored in the memory 11 by the execution controller 170 (described later).

When the determination result output by the time determiner 143 indicates that the data collection time is at or later than the start time, the delivery controller 142 determines that the data is valid. When the determination result output by the time determiner 143 indicates that the data collection time is earlier than the start time, the delivery controller 142 determines that the data is invalid. This is because the data delivery control apparatus 100 handles the data collected earlier than the start time as invalid data in the embodiment.

When determining that the data is valid, the delivery controller 142 delivers the data to the next destination directly or through the deliverer 130 in accordance with the setting details for the data sequence stored in the data sequence setting storage 150. The next destinations include the data processor 160 in the data delivery control apparatus 100, the data processing apparatus 400, and the PLCs 603 and 604. In contrast, when determining that the data is invalid, the delivery controller 142 discards the data without delivering the data to any destination.

The time determiner 143 determines whether the collection time indicated by the collection time information added to the data provided from the delivery controller 142 is at or later than the start time at which the current data sequence is started, and outputs the determination result to the delivery controller 142. The determination result output by the time determiner 143 is expressed in binary including, for example, the value indicating that the collection time is at or later than the start time and the value indicating that the collection time is earlier than the start time.

The data sequence setting storage 150 stores the setting details for the data sequence that defines the details of data processing to be performed on the collected data and the sequence of the data processing. The setting details may be referred to as data sequence setting data. The data sequence setting data includes information designated by the user including the data collection target and a subject that performs each step of processing. The user stores data sequence setting data into the data sequence setting storage 150 with the maintenance tool 500.

FIG. 4 shows examples of data stored in the data sequence setting storage 150. The stored examples shown include information indicating the data collection target, collection data, processing, analytical processing, diagnostic processing, and feedback destination. Examples of the data collection target include information identifying the device serving as the data collection target. Examples of the collection data include information identifying the subject that performs data collection processing. Examples of the processing include information identifying the subject that performs processing on the collected data. Examples of the analytical processing include information identifying the subject that performs analytical processing on the collected data. Examples of the diagnostic processing include information identifying the subject that performs processing of diagnosing the target to be diagnosed based on the analysis result. The functions of the data sequence setting storage 150 are implemented by the memory 11 shown in FIG. 2.

In the embodiment, as shown in FIG. 4, the processing, the analytical processing, and the diagnostic processing are performed in this order. In the illustrated example, in the setting No. 1, the data processor 160 processes vibration data 001 collected from the PLC 604, a data processor 410 in the data processing apparatus 400 analyzes the processed data, and the data processor 410 diagnoses the data based on the analysis result, and feeds the diagnosis back to the PLC 604.

The data processor 160 shown in FIG. 1 performs predetermined processing on data provided from the delivery controller 142, and provides the processed data to the delivery controller 142. The processing includes missing value processing and outlier processing as the preprocessing for the analytical processing. The functions of the data processor 160 are implemented by the CPU 14 shown in FIG. 2 executing the processing program 114.

The execution controller 170 shown in FIG. 1 controls activation of each component in the data delivery control apparatus 100. When the execution controller 170 receives an activation instruction from an operation reception 510 in the maintenance tool 500 as in arrow A drawn with a dash-dot-dash line, the execution controller 170 transmits activation instructions to the collectors 110, the deliverer 130, the validity determiner 140, and the data processor 160 as in arrows B drawn with broken lines to activate each component. When activating the collectors 110, the execution controller 170 provides, to the collectors 110, data indicating the data sequence settings stored in the data sequence setting storage 150. When activating each component in the data delivery control apparatus 100, the execution controller 170 stores the current time as start time in the memory 11. Upon receiving a stop instruction from the operation reception 510 in the maintenance tool 500, the execution controller 170 stops the collectors 110, the deliverer 130, the validity determiner 140, and the data processor 160.

Upon receiving data indicating the details of data sequence settings input by the user from the operation reception 510 in the maintenance tool 500, the execution controller 170 stores the received data into the data sequence setting storage 150. The functions of the execution controller 170 are implemented by the CPU 14 shown in FIG. 2.

The functional components of the data processing apparatus 400 will now be described. As shown in FIG. 1, the data processing apparatus 400 includes, as a functional component, the data processor 410 that performs analytical and diagnostic processing.

The data processor 410 analyzes data provided from the data delivery control apparatus 100, diagnoses the FA devices 601 and 602 based on the analysis result, and outputs the diagnosis. The data provided from the data delivery control apparatus 100 is data collected from the PLCs 604 and 605, and to which collection time information is added. The data processor 410 adds this collection time information to the diagnosis as information identifying the data provided from the data delivery control apparatus 100.

The data processor 410 transmits data indicating the above diagnosis to the data delivery control apparatus 100. In the embodiment, the data processor 410 is programmed to sequentially perform analytical and diagnostic processing on data received from the data delivery control apparatus 100 and return the diagnosis to the data delivery control apparatus 100. The data processor 410 may not be activated at the same timing as the timing of activation of each component in the data delivery control apparatus 100. The data processor 410 is simply to be activated when the user instructs start of collection and delivery processing. The functions of the data processor 410 are implemented by the CPU 43 shown in FIG. 2 executing the analysis diagnostic program 411. The data processor 410 is an example of data processing means according to the present disclosure.

As shown in FIG. 1, the maintenance tool 500 includes the operation reception 510 as a functional component. The operation reception 510 transmits a signal indicating the operation received from the user and data input by the user to the data delivery control apparatus 100. More specifically, the operation reception 510 transmits the processing start instruction relating to the data collection and delivery control received from the user to the data delivery control apparatus 100 as indicated with arrow A drawn with a dash-dot-dash line. The operation reception 510 then transmits the data indicating the details of the data sequence settings input by the user to the data delivery control apparatus 100. The functions of the operation reception 510 are implemented by the CPU 55 shown in FIG. 2.

The sequence of validity determination performed by the validity determiner 140 in the data delivery control apparatus 100 will now be described. The user may instruct the start of collection and delivery processing with the maintenance tool 500. In response to the instruction from the user, the execution controller 170 shown in FIG. 1 activates the collectors 110, the deliverer 130, the validity determiner 140, and the data processor 160. Upon receiving the start instruction from the user, the execution controller 170 stores the current time as start time in the memory 11. The data processor 410 in the data processing apparatus 400 has already been activated. The collectors 110 have collected data from the PLCs 603 and 604 at designated collection intervals, and have transmitted the collected data to the deliverer 130.

Figure 5:
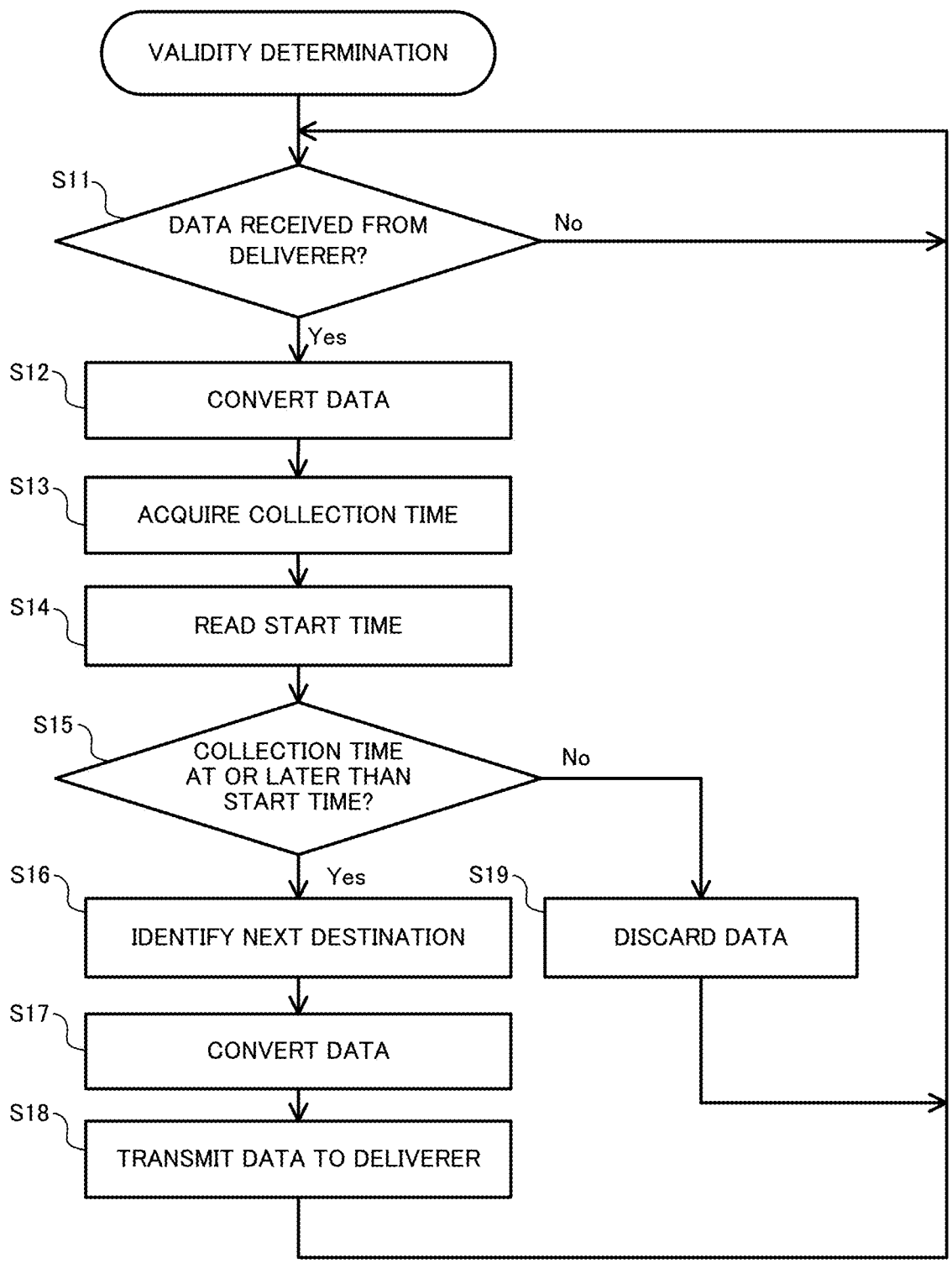
FIG. 5 is a flowchart of validity determination on data according to the embodiment.

Upon receiving data from the deliverer 130, the validity determiner 140 performs validity determination shown in FIG. 5 to determine whether the data is valid.

Upon receiving data from the deliverer 130 (Yes in step S11), the converter 141 in the validity determiner 140 converts the received data (step S12), and provides the resultant data to the delivery controller 142. When the data received from the deliverer 130 is the data received from the data processing apparatus 400, the converter 141 converts the data format into the internal format determined for the data delivery control apparatus 100. When the data received from the deliverer 130 is the data addressed to the PLCs 603 and 604, the converter 141 converts the data format into the internal format determined for the PLCs 603 and 604.

The delivery controller 142 acquires collection time from collection time information added to the data provided from the converter 141 (step S13). The delivery controller 142 outputs information indicating collection time to the time determiner 143. When information indicating the collection time is provided from the delivery controller 142, the time determiner 143 reads information stored in the memory 11 and indicating the start time at which the current sequence is started (step S14). The time determiner 143 determines whether the collection time is at or later than the start time (step S15), and outputs the determination result to the delivery controller 142.

When the result output by the time determiner 143 indicates that the collection time is at or later than the start time (Yes in step S15), the delivery controller 142 identifies the details of the data sequence setting stored in the data sequence setting storage 150 and the next destination of the data (step S16). The delivery controller 142 outputs the data with information indicating the identified destination to the converter 141.

The converter 141 converts data received from the delivery controller 142 (step S17), and transmits the resultant data and information indicating the destination to the deliverer 130 (step S18). The deliverer 130 thus delivers data to the designated destination. Thereafter, the converter 141 returns to the processing in step S11 and waits for data from the deliverer 130.

In contrast, when the result output by the time determiner 143 indicates that the collection time is earlier than the start time in step S15 (No in step S15), the delivery controller 142 discards the data (step S19).

The validity determination is performed by the validity determiner 140 in this manner.

Figure 6:
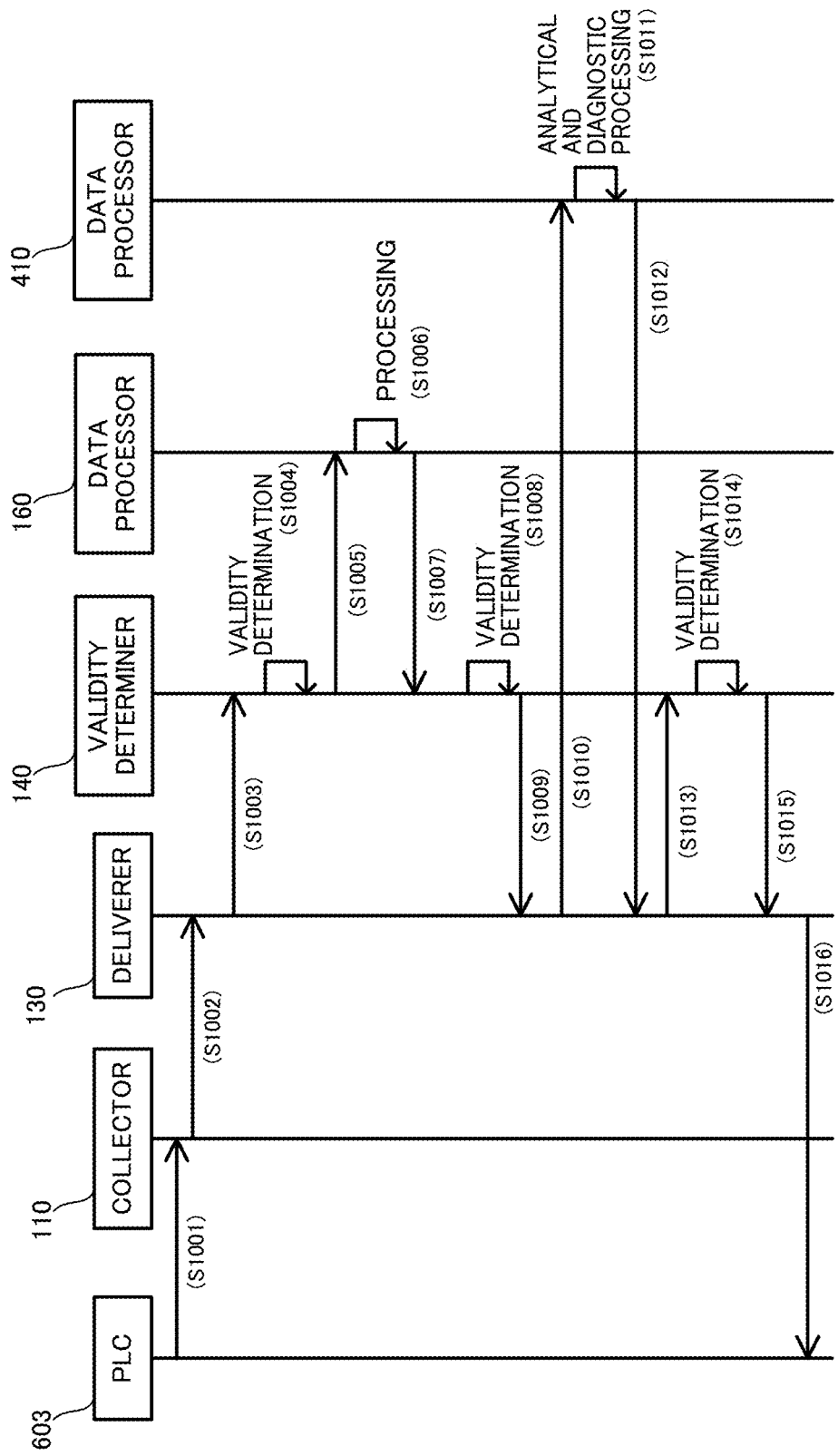
FIG. 6 is a diagram of an example of a data sequence according to the embodiment.

With reference to FIG. 6, an example of the entire data sequence in the diagnosis system 1 with the above structure will now be described. In the illustrated example, the data processor 410 in the data processing apparatus 400 analyzes and diagnoses data collected from the PLC 603. Although not shown, the PLC 603 collects data output by sensors installed in the FA device 601 shown in FIG. 2. The FA device 601 is the target to be diagnosed.

As shown in FIG. 6, the collector 110 collects data from the PLC 603 serving as a designated data collection target at designated collection intervals (step S1001). The collector 110 transmits collected data to the deliverer 130 (step S1002).

The deliverer 130 transmits data received from the collector 110 to the validity determiner 140 (step S1003). The validity determiner 140 performs validity determination to determine the validity of the data received from the collector 110 (step S1004). When determining that the data is valid, the validity determiner 140 transmits the data to the data processor 160 in accordance with the setting indicated by the data sequence setting data stored in the data sequence setting storage 150 shown in FIG. 4 (step S1005).

The data processor 160 performs processing on the data received from the validity determiner 140 (step S1006), and transmits the processed data to the validity determiner 140 (step S1007). The validity determiner 140 performs validity determination to determine the validity of the data received from the data processor 160 (step S1008). When determining that the data is valid, the validity determiner 140 transmits the data together with destination information indicating the destination to the deliverer 130 in accordance with the setting indicated by the data sequence setting data stored in the data sequence setting storage 150 shown in FIG. 4 (step S1009). The data processor 410 in the data processing apparatus 400 is designated as the destination. The deliverer 130 transmits the data to the destination indicated by the destination information provided from the validity determiner 140 (step S1010).

The data processor 410 analyzes the data received from the data delivery control apparatus 100, and diagnoses the target to be diagnosed based on the analysis result (step S1011). The data processor 410 transmits the diagnosis to the data delivery control apparatus 100 (step S1012).

The deliverer 130 in the data delivery control apparatus 100 transmits the data received from the data processing apparatus 400 to the validity determiner 140 (step S1013). The validity determiner 140 determines the validity of data received from the deliverer 130 (step S1014). When determining that the data is valid, the validity determiner 140 transmits the data together with destination information indicating the data destination to the deliverer 130 in accordance with the setting indicated by the data sequence setting data stored in the data sequence setting storage 150 shown in FIG. 4 (step S1015). The deliverer 130 transmits the data to the destination indicated by the destination information provided from the validity determiner 140 (step S1016).

Thus, the PLC 603 controls the FA device 601 based on the diagnosis received from the data delivery control apparatus 100. This is an example of the entire data sequence in the diagnosis system 1.

In the embodiment, as described above, the data delivery control apparatus 100 determines whether the externally received data, or data received from the PLCs 603 and 604 and the data processing apparatus 400, is valid. More specifically, the data delivery control apparatus 100 compares the collection time indicated by the collection time information added to the data and the start time at which the sequence is started, determines that the data is valid when the collection time is at or later than the start time, and delivers the data to the next destination.

Figure 7:
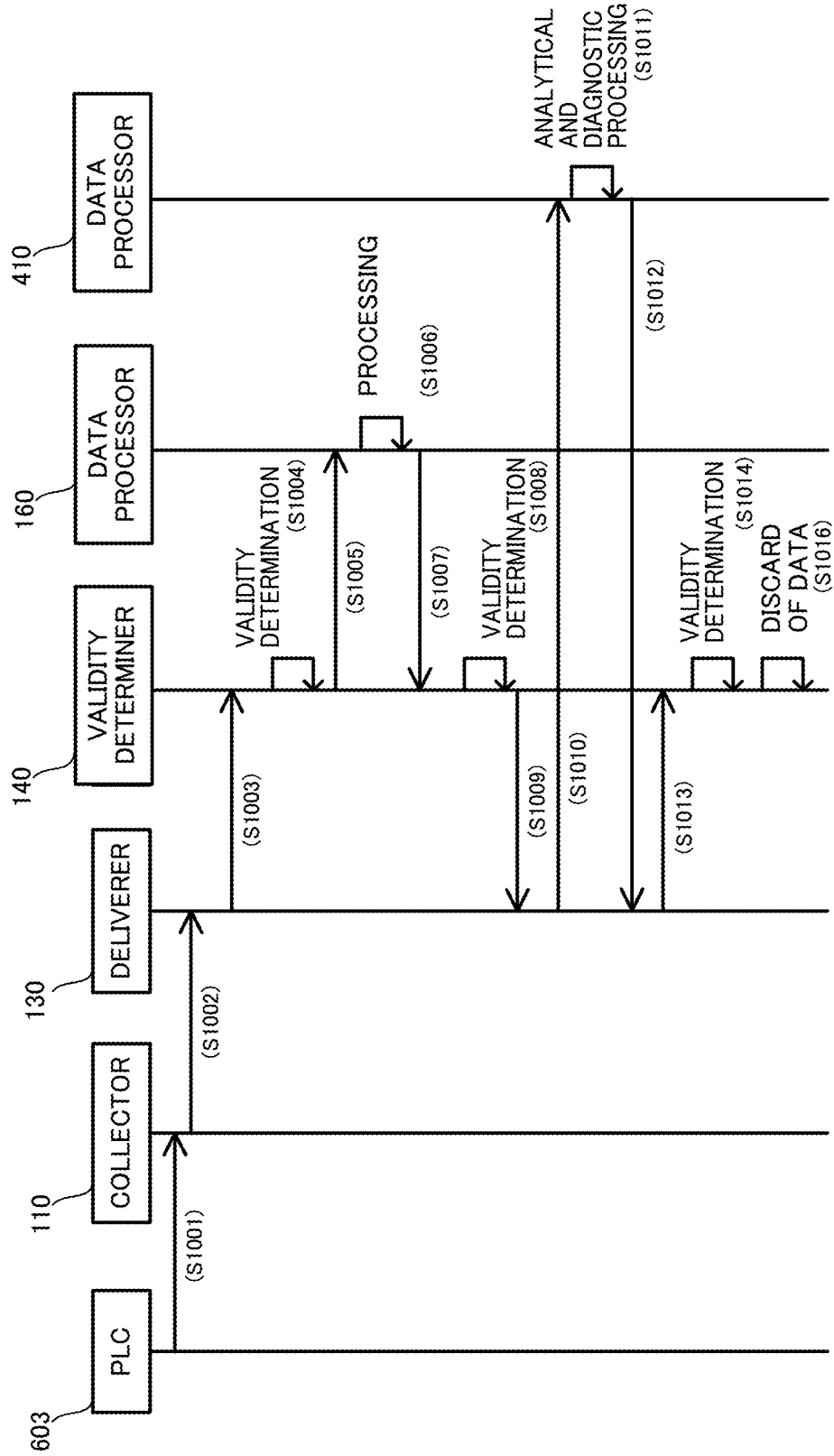
FIG. 7 is a diagram of another example of a data sequence according to the embodiment.
Figure 8:
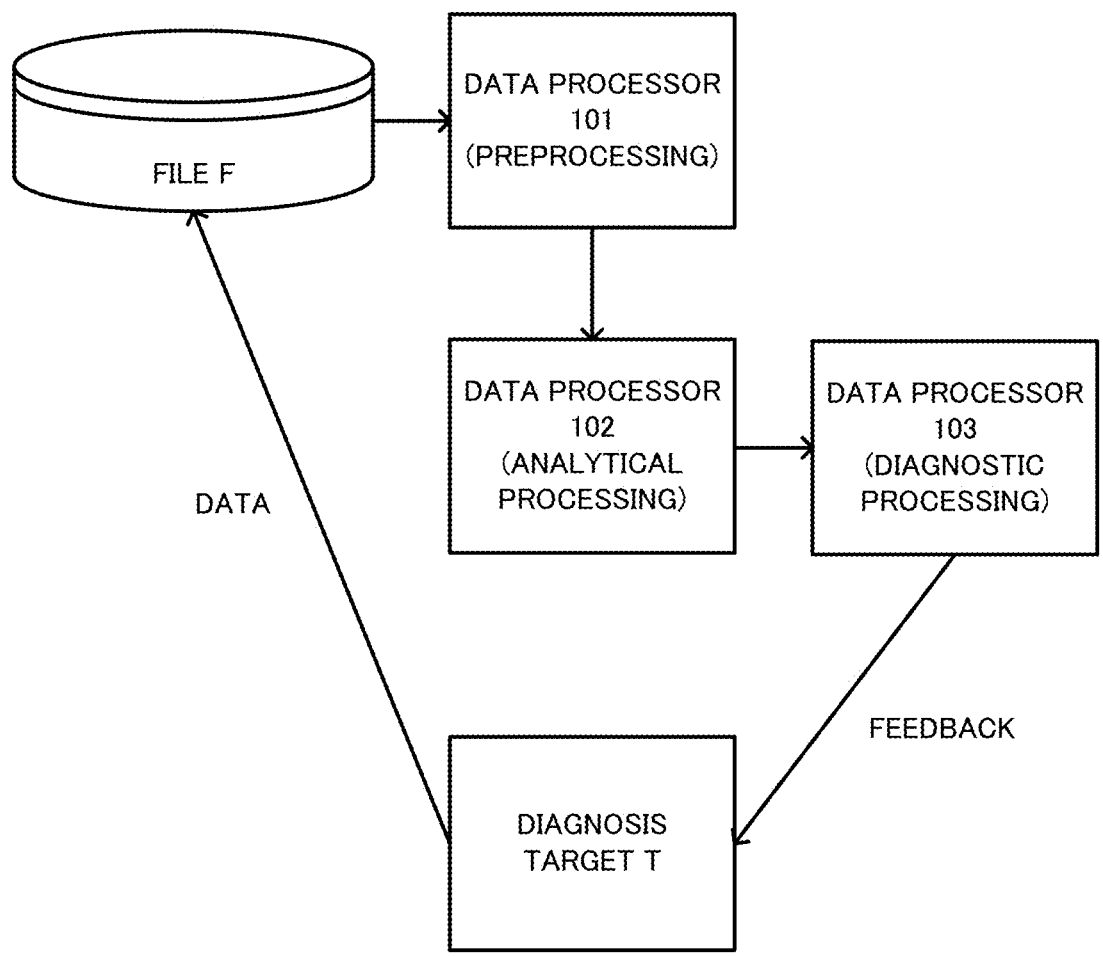
FIG. 8 is a diagram illustrating a known issue.

When the collection time is earlier than the start time, the data delivery control apparatus 100 determines that the data is invalid. For example, as shown in FIG. 7, the data processor 410 may transmit data to the deliverer 130 in the data delivery control apparatus 100 in step S1012. The validity determiner 140 determines that the data received from the data processor 410 is invalid in validity determination in step S1014. The validity determiner 140 discards the data without delivering the data to the next destination (step S1016). Thus, the invalid data is prevented from being delivered outside the data delivery control apparatus 100. In FIG. 7, the processing from step S1001 to step S1014 is similar to the processing in FIG. 6.

As described above, the data delivery control apparatus 100 determines the data validity based on collection time information added to the data. When the data processing apparatus 400 has analyzed and diagnosed data left in the data processing apparatus 400 before the start of the current sequence, or data not to be processed, and transmitted the diagnosis to the data delivery control apparatus 100, the data delivery control apparatus 100 prevents delivery of the diagnosis to the PLCs 603 and 604 because the data is invalid. Thus, the data delivery control apparatus 100 can control delivery not to provide the diagnosis based on invalid data to the PLCs 604 and 605. Thus, the processing of data not to be processed by the PLCs 604 and 605 can be prevented. The data delivery control apparatus 100 with the above structure is particularly effective when, for example, multiple data processors perform a series of processing in cooperation.

In the embodiment, the data delivery control apparatus 100 collects data from the FA device 601 through the PLC 603, and collects data from the FA device 602 through the PLC 604. In some embodiments, the data delivery control apparatus 100 may directly collect data from the FA devices 601 and 602.

In the embodiment, the data delivery control apparatus 100 includes the collector 110 that performs data collection. In some embodiments, the collector 110 may be installed in another apparatus independent of the data delivery control apparatus 100. In this case, for example, the validity determiner 140 may use the timing when the data delivery control apparatus 100 starts delivery processing as the starting point, and determine that data collected at or after this timing is valid.

In the embodiment, the data delivery control apparatus 100 and the data processing apparatus 400 are physically different apparatuses. In some embodiments, for example, the data delivery control apparatus 100 and the data processing apparatus 400 may be implemented on different virtual machines on the same apparatus.

In the embodiment, the data delivery control apparatus 100 performs preprocessing on data collected by the collector 110. In some embodiments, the data delivery control apparatus 100 may not perform preprocessing on the collected data. In this case, the data delivery control apparatus 100 may eliminate the data processor 160.

In the embodiment, the validity determiner 140 in the data delivery control apparatus 100 does not determine the validity of data received from the data processor 160 in the same apparatus. In some embodiments, the validity determiner 140 may also determine the validity of data received from the data processor 160.

In the embodiment, as shown in FIG. 3, an IP address and a port number are used as examples of information identifying the device serving as a data collection target in the setting details for data collection. In some embodiments, the unit number on the network may be used as information identifying the device serving as a data collection target.

Examples usable as a recording medium that records the above programs include a non-transitory computer-readable recording medium including a magnetic disk, an optical disk, a magneto-optical disk, a flash memory, a semiconductor memory, and a magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

F File
T Target to be diagnosed
001 Vibration data
160, 410 Data processor
1 Diagnosis system
11, 41, 51 Memory
12 Fieldbus interface
13 Information network interface
14, 43, 55 CPU
19, 49, 59 Bus
42, 52 Communication interface
53 Input device
54 Display device
100 Data delivery control apparatus
101, 102, 103 Data processor
110 Collector
111 Collection program
112 Delivery control program
113 Delivery program
114 Processing program
120 Collection setting storage
130 Deliverer
140 Validity determiner
141 Converter
142 Delivery controller
143 Time determiner
150 Data sequence setting storage 170 Execution controller
400 Data processing apparatus
411 Analysis diagnostic program
500 Maintenance tool
510 Operation reception
511 Maintenance program
601, 602 FA device
603, 604 Programmable logic controller (PLC)
701, 702 Network

The invention claimed is:

1. A data delivery control apparatus comprising:
processing circuitry configured as a validity determiner to determine whether data collected from a device is valid based on whether a collection time indicated by collection time information added to the data is at or later than a starting time indicating a time at which a data sequence as a preset data processing sequence is started; and
the processing circuitry further configured as a deliverer to deliver the data in accordance with a data sequence setting defining the data sequence in response to the validity determiner determining that the data is valid, wherein
the validity determiner determines that the data is valid for the collection time at or later than the starting time, and provides the data to the deliverer together with destination information indicating a destination in accordance with the data sequence setting.

2. The data delivery control apparatus according to claim 1, wherein
the validity determiner determines that the data is invalid for the collection time earlier than the starting time, and does not provide the data to the deliverer.

3. The data delivery control apparatus according to claim wherein
the validity determiner discards the data in response to determining that the data is invalid.

4. The data delivery control apparatus according to claim 1, further comprising:
a data processor to perform preset processing on the data; and
a collector to collect data from the device and output to the deliverer the data to Which the collection time information is added,
wherein
the deliverer delivers the data output by the collector to the validity determiner,
the validity determiner determines whether the data is valid, and provides, in response to determining that the data is valid, the data to the deliverer together with destination information indicating a destination in accordance with the data sequence setting, and
the deliverer delivers the data output by the validity determiner to the data processor in response to the data processor being the destination indicated by the destination information.

5. The data delivery control apparatus according to claim 4, wherein
the deliverer delivers data output by the data processor to the validity determiner,
the validity determiner determines whether the data is valid, and outputs, in response to determining that the data is valid, the data to the deliverer together with the destination information, and
the deliverer delivers the data output by the validity determiner to the device in response to the device being the destination indicated by the destination information.

6. A method comprising:
determining, with a data delivery control apparatus, whether data collected from a device is valid based on whether a collection time at which the data is collected is at or later than a starting time indicating a time at which a data sequence is started;
delivering, with the data delivery control apparatus, the data determined to be valid in accordance with a data sequence setting indicating a preset data processing sequence; and
the determining determines that the data is valid for the collection time at or later than the starting time, and provides the data to together with destination information indicating a destination in accordance with the data sequence setting to the delivering.

7. A non-transitory computer readable recording medium storing a program for causing a computer to perform operations comprising:
determining whether data collected from a device is valid based on whether a collection time at which the data is collected from the device is at or later than a starting time indicating a time at which a data sequence is started;
delivering the data determined to be valid in accordance with a data sequence setting indicating a preset data processing sequence; and
the determining determines that the data is valid for the collection time at or later than the starting time, and provides the data to together with destination information indicating a destination in accordance with the data sequence setting to the delivering.

* * * * *